United States Patent [19]

Munk

[11] Patent Number: 4,629,594

[45] Date of Patent: Dec. 16, 1986

[54] METHOD OF PRODUCING SHAPED PARTS

[75] Inventor: Edmund Munk, Oberstenfeld, Fed. Rep. of Germany

[73] Assignee: Werzalit-Werke J. F. Werz KG, Oberstenfeld, Fed. Rep. of Germany

[21] Appl. No.: 716,233

[22] Filed: Mar. 26, 1985

Related U.S. Application Data

[62] Division of Ser. No. 573,561, Jan. 26, 1984, Pat. No. 4,544,344.

[30] Foreign Application Priority Data

Feb. 5, 1983 [EP] European Pat. Off. ........... 83101104

[51] Int. Cl.[4] .............................................. B29C 43/04

[52] U.S. Cl. ...................................... 264/69; 264/109; 264/118; 264/119; 264/157

[58] Field of Search ..................... 264/69, 71, 72, 109, 264/119, 160, 157, 257, 319, 118

[56] References Cited

U.S. PATENT DOCUMENTS

| | | | |
|---|---|---|---|
| 4,061,813 | 12/1977 | Geimer et al. | 428/183 |
| 4,221,751 | 9/1980 | Haataja et al. | 264/119 |

FOREIGN PATENT DOCUMENTS

| | | | |
|---|---|---|---|
| 589065 | 1/1978 | U.S.S.R. | 264/72 |

*Primary Examiner*—Donald Czaja
*Assistant Examiner*—Mary Lynn Fertig
*Attorney, Agent, or Firm*—Michael J. Striker

[57] ABSTRACT

In an arrangement for and a method of producing shaped parts of a non-swellable mixture of fibers and heat-hardenable resin, a pressing mass divider is introduced into lower pressing tool during filling of the mixture.

3 Claims, 7 Drawing Figures

METHOD OF PRODUCING SHAPED PARTS

This is a division of application Ser. No. 573,561, filed Jan. 26, 1984 now U.S. Pat. No. 4,544,344.

BACKGROUND OF THE INVENTION

The present invention relates to a method of and an arrangement for producing shaped parts. More particularly, it relates to an arrangement for and method of producing shaped parts from a non-swellable mixture of fibers with heat-hardenable synthetic resin with the aid of pressing upper and lower parts which receive the mixture to be pressed.

The invention particularly deals with the production of such shaped parts which are relatively thin-walled and in which at least two components of the shaped parts are inclined at a steep angle relative to one another. For the production of such shaped parts, the lower pressing tool and the upper pressing tool are provided with respective depressions or elevations. The mixture to be pressed is filled in the required quantity and filling height into the lower pressing tool. During subsequent lowering of the upper pressing tool, the mixture is compacted, especially in the depressions of the lower pressing tool to the steep side surfaces. This is, however, frequently not implemented, since the filled mixture because of its fiber structure forms a compound which is no longer separated by the lowering upper pressing part.

This phenomenon leads to an undesirable concentration of an excessive quantity of the mixture to be pressed at the bottom of the depression of the lower pressing tool and to excessive compression of this mixture quantity. This results in a non-uniform density and therefore in a non-uniform strength of the produced shaped parts.

SUMMARY OF THE INVENTION

Accordingly, it is an object of the present invention to provide an arrangement for and a method of producing shaped parts, which avoids the disadvantages of the prior art.

More particularly, it is an object of the present invention to provide an arrangement for and a method of manufacturing shaped parts of a non-swellable mixture, which provides for uniform compacting of the mixture to be pressed during pressing.

In keeping with these objects and with others which will become apparent hereinafter, one feature of the present invention resides in an arrangement for producing shaped parts, in which during filling of a mixture to be pressed a pressing mass divider is introduced into a mixture receiving space of a lower pressing tool.

It is also an object of the present invention to provide a method of producing shaped parts, in accordance with which the step of filling a mixture is accompanied by the step of introducing a pressing mass divider into at least one pressing tool, for example a lower pressing tool.

In accordance with the present invention, the pressing mass divider is introduced into the lower pressing tool prior to filling of the mixture to be pressed and retained in the press. During the filling step or after the filling of the mixture to be pressed, the pressing mass divider can be subjected to vibrations in one or more directions which form an angle different from zero with the pressing direction. After the required quantity of the mixture to be pressed is filled into the lower pressing tool, the pressing mass divider is removed from the lower pressing tool, before displacement of the upper pressing tool to the lower pressing tool and pressing the shaped parts in the desired manner without density variations.

The arrangement and method in accordance with the present invention can be used both for cold pressing and/or hot pressing.

The novel features of the present invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
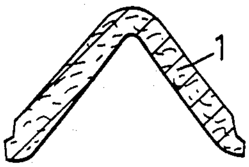
FIG. 1 is a front view of a shaped part produced by the inventive arrangement and method.

FIG. 1 shows an example of a shaped part which is identified with reference numeral 1 and can be produced in accordance with the inventive arrangement and method. The shaped part 1 shown in FIG. 1 is an angular strip which can be used, for example, for packing of parallelepiped-like devices, such as electric ranges, washing machines, and the like, for protecting the edges of these devices. FIG. 1 shows only a cross section of the angular strip, whose elongation extends with an unchanged cross section in the plane of the drawing.

Figure 2:
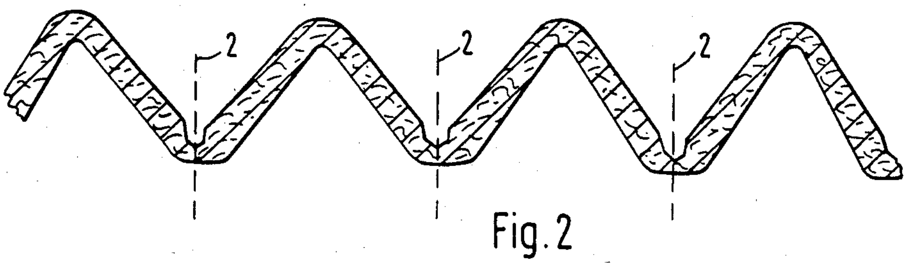
FIG. 2 is a front view of a shaped element which includes a plurality of the shaped parts produced in accordance with the present invention.

The angular strips 1 are produced, as a rule, not as individual shaped parts, but as pressed shaped elements including a plurality of the shaped parts, as shown in FIG. 2. Subsequently, the individual shaped parts are made by separation of the shaped elements along the lines 2, as shown in FIG. 2.

Figure 3:
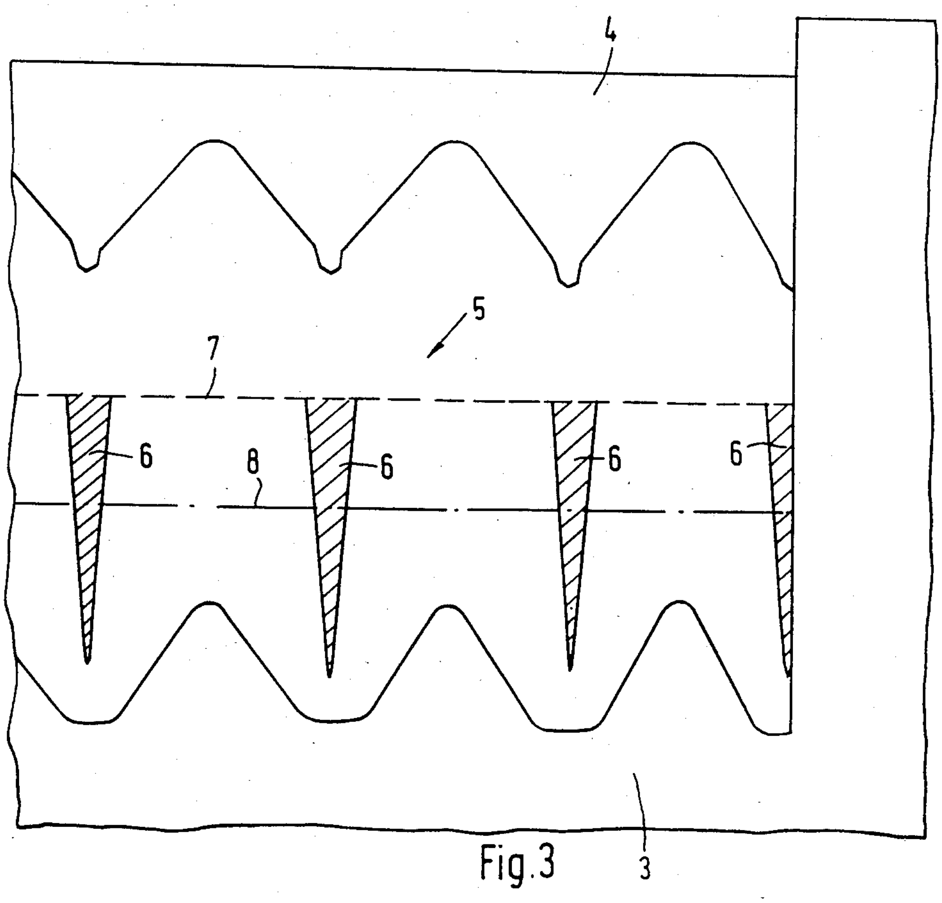
FIG. 3 is a view showing a cross section of the press for producing the shaped element of FIG. 2, wherein a pressing mass divider is used in accordance with the present invention during the filling step.

FIG. 3 shows a press for producing a shaped element shown in FIG. 2. The press has a lower pressing tool 3 which is designed in correspondence with the shape of the shaped element to be pressed. As can be seen from FIG. 3, the shape of the lower pressing tool 3 has very steep surfaces which can merge into one another either direction or with interposition of flat surfaces. The press in FIG. 3 is shown during the filling step. An upper pressing tool 4 is also designed in correspondence with the shape of the shaped element to be pressed and is located at its upper end position during this step.

In accordance with the present invention, a pressing mass divider 5 is provided during the filling step between the upper pressing tool 4 and the lower pressing tool 3. In the example shown in FIG. 3 the pressing mass divider is composed of a plurality of knife-like webs 6 extending substantially parallel to one another and mounted, for example, on a frame which is identified by the line 7. The knife-like webs 6 can extend, if needed, to the bottoms of the depressions in the lower pressing tool 3. When the pressing mass divider 5 assumes its position in the press, the mixture is filled into the lower pressing tool, for example up to the line identified with reference numeral 8. During the filling or after the filling, the pressing mass divider can be subjected to vibrations.

The mixture for producing the shaped parts is composed of fibers, such as for example lignocellulose-containing fibers, comminuted and dried wooden chips, crushed sugar cane fibers, and the like, and a heat-hardenable synthetic resin, such as a melamine-, ureaformaldehyde- or phenolformaldehyde- resin. Instead of the above mentioned fibers, also fibers of other materials can be used, such as for example glass fibers and other, alone or in mixture with one another. The respective binding medium, for example organic binding medium, is added to the above mentioned composition.

After the filling of the mixture into the lower pressing tool and, in some cases, the vibration of the pressing mass divider, the pressing mass divider is removed from the space between the lower pressing tool and the upper pressing tool. After this, the upper pressing tool is lowered onto the lower pressing tool, and the shaped element is finally pressed, when a single stage pressing process is sufficient.

Figure 4:
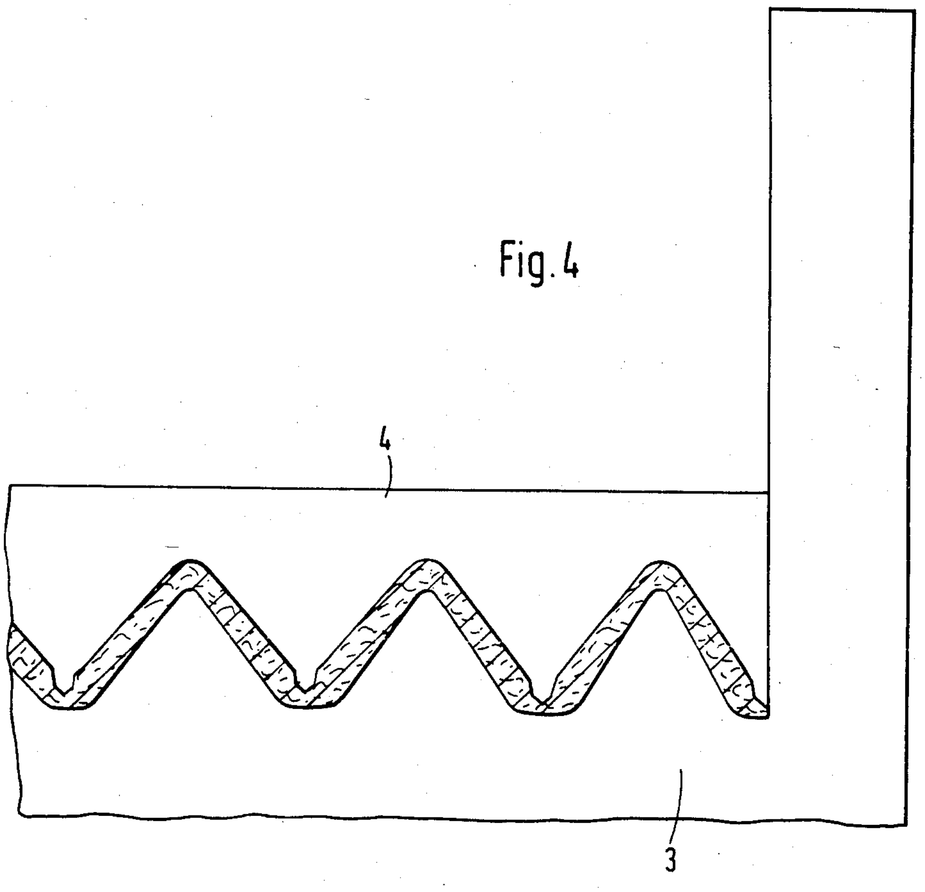
FIG. 4 is a view showing a section of the press according to FIG. 3, at the end of the pressing step.

During pressing of the shaped element, the press assumes a position which is shown in FIG. 4. Subsequently, the upper pressing tool 4 is again displaced upwardly and the shaped element is removed from the press.

The press illustrated in FIGS. 3 and 4 is designed so that the lower pressing tool 3 is stationary, whereas the upper pressing tool 4 is movable vertically upwardly and downwardly. In principle, it does not make any difference which pressing tool moves against the respective countertool onto the pressing mass. It is also possible that the lower tool displaces upwardly, or both tools displace toward and away from each other.

It is to be understood that with this press shaped parts with different shapes can be produced. Thus, it is feasible that the shaped elements are formed of the row composed of a plurality of cup-shaped depressions with steep walls which are held at a distance by more or less flat surfaces arranged therebetween. Such shaped elements are for example designed as egg structures.

Figure 5:
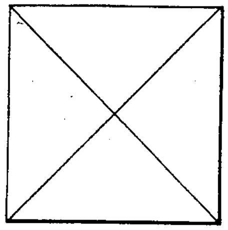
FIG. 5 is a plan view from below of a pyramid-shaped body of the pressing mass divider.
Figure 6:
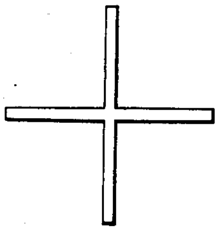
FIG. 6 is a plan view from below of another cross-shaped knife-like pressing mass divider.
Figure 7:
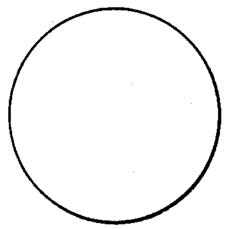
FIG. 7 is a plan view from below of a ball-shaped body of the pressing mass divider.

The pressing mass divider for producing such shaped parts is formed in principle similarly to the pressing mass divider shown in FIG. 3. However, the bodies extending into the depressions of the pressing tool must be provided with a respective design, for example a pyramid-shaped design shown in FIG. 5, a cross-shaped knife design shown in FIG. 6, or a ball-shaped design shown in FIG. 7. FIGS. 5–7 show the plan view from below of such a body. Also, any other shapes of the bodies are possible. However, these bodies have more or less great similarity with the shapes of the shaped parts to be pressed.

It will be understood that each of the elements described above, or two or more together, may also find a useful application in other types of constructions and methods differing from the types described above.

While the invention has been illustrated and described as embodied in an arrangement for and a method of producing shaped parts, it is not intended to be limited to the details shown, since various modifications and structural and procedural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing shaped parts from a nonswellable mixture of fibers with a heat-hardenable synthetic plastic, comprising the steps of providing upper and lower pressing tools movable between an open position in which they are spaced from one another and a space therebetween is filled with said mixture and a closed position in which they are located close to one another and said mixture is pressed therebetween; providing a pressing mass divider and introducing said divider into said space before a filling step and dividing the mixture by said pressing mass divider during filling of the mixture into said space; and removing said pressing mass divider from said space between the upper and lower pressing tools before said upper and lower pressing tools are moved to said closed position and said mixture is pressed.

2. A method as defined in claim 1; and further comprising the step of continuously moving the pressing mass divider in a direction which forms an angle different from zero with a pressing direction.

3. A method as defined in claim 1; and further comprising the step of subjecting said divider to vibrations during said filling step.

* * * * *